March 10, 1942.   H. F. DUBAS   2,275,743
CAMERA TRIPOD
Filed Dec. 13, 1938

INVENTOR
Henry F. Dubas
by
ATTORNEY

Patented Mar. 10, 1942

2,275,743

UNITED STATES PATENT OFFICE 2,275,743

CAMERA TRIPOD

Henry F. Dubas, Albany, N. Y.

Application December 13, 1938, Serial No. 245,446

5 Claims. (Cl. 248—188)

One of the disadvantages in tripods, ordinarily employed for supporting cameras, lies in the fact that the legs thereof cannot be positively secured against movement relative to the tripod head, when the tripod is set up, and such inability positively to secure the tripod legs in desired, relatively spaced relation very often results in slipping of the tripod legs, causing the camera carried thereby to fall and very often resulting in material and appreciable damage to the camera. Since many cameras in present use both by amatures and professional photographers are quite expensive, a tripod for such cameras should be of a dependable character and capable of forming a stable camera support.

In practice, camera tripods are made as compact and light in weight as possible so that they may be easily transported. To attain such compactness and lightness, such tripods, of which I am aware, lack suitable means for locking or securely holding the legs thereof in position when the tripod has been properly set up and, therefore, they are quite unstable and very undependable. Furthermore, in ordinary camera tripods heretofore employed, the leg-locking mechanisms thereof exert substantially very little if any locking pressure in securing the legs in place.

Where tripods are, for example, set up on smooth, polished floors where substantially no friction occurs between the legs and the floor, a tripod comprising a leg-locking mechanism capable of positively securing the tripod legs against movement relative to the tripod head is extremely desirable because otherwise a stable set up may apparently be obtained which, in reality, is wholly insecure and, a jar or even a slight force, such as that exerted by a moderate wind, may cause the legs to slip and the camera supported thereby may be seriously damaged.

It is, therefore, the primary object of my invention to provide a tripod for cameras which is so constructed and arranged that the legs thereof may be firmly and positively locked against movement relative to the tripod head. Another object lies in providing a tripod of the foregoing character which is very compact and light in weight. Another object resides in providing a tripod comprising leg-locking mechanisms which may be quickly, easily and simultaneously operated and which will grip and hold the legs in desired positions under a pressure far greater than the force applied by the operator to the mechanisms. Further objects reside in providing a tripod of the foregoing character which comprises but a few parts, may be cheaply manufactured and easily assembled.

With these and other objects in view, my invention includes the novel elements and the combinations and arrangements thereof described below and illustrated in the accompanying drawing, in which—

Figure 1:
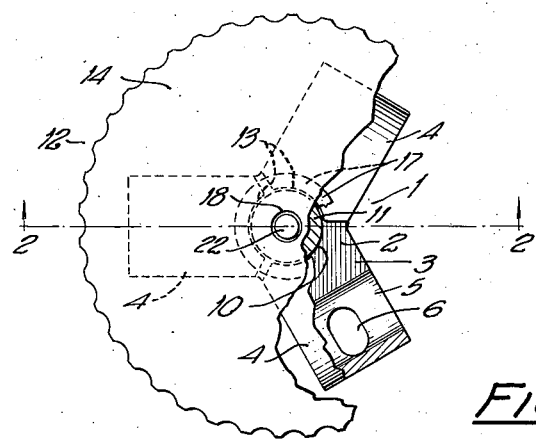
Fig. 1 is a fragmentary plan view, partially in section, of a preferred embodiment of my tripod.

Referring to the drawing wherein I have illustrated a preferred embodiment of my invention, 1 indicates generally the tripod head which comprises a plate-like element 2 formed with a plurality of radially extending arms 3. A plurality of jaws 4 are arranged respectively to overlie the arms 3 and are connected thereto at their outer ends. Preferably, as illustrated, the jaws 4 and arms 3 are integral at their outer ends but otherwise are slightly spaced apart and relatively movable at their inner ends. The arms or jaws 3 and jaws 4, which respectively are cooperatively arranged, may be transversely drilled to provide substantially semi-cylindrical bearing surfaces in each jaw which form the cylindrical openings 5 adapted pivotally to receive one end of the tripod legs. In the embodiment illustrated, each of the arms 3 is provided with a slot 6, extending along the longitudinal axis of the arm, through which the tapered end portion 7 of a tripod leg 8 is adapted to extend. In accordance with the construction illustrated, the tripod legs 8 are provided at one end thereof with trunnions 9 which are adapted to be journalled in the cylindrical openings 5 and between the jaws 3 and 4. For assembly purposes, the ends of the tripod legs may be threaded and the trunnions 9 provided with a threaded opening into which the ends of the legs may be screwed after the trunnions have been mounted in the bearings therefor.

The plate-like element 2 is preferably drilled and tapped substantially in the center thereof to provide a threaded opening 10 which is adapted to receive the screw threaded spindle 11 of an operating mechanism indicated generally at 12. The inner ends of the jaws 4 are preferably arcuate in shape, as indicated at 13, with cut away corners which provide clearance between adjacent jaws, and the inner, arcuate ends of the jaws preferably lie substantially on a circle slightly greater in diameter than the diameter of the spindle 11. Hence, the spindle 11 may freely pass between the inner ends of the jaws 4 and engage the threaded opening 10 in the lower jaws or arms 3. The operating mechanism 12 may also comprise a disc 14, preferably integral with the spindle 11 and provided at its outer periphery with a depending flange 15. The flange 15 is preferably vertically fluted or knurled so that it may be firmly gripped by the hand when being operated. A shoulder 16 may be provided surrounding the spindle 11 and a washer 17 may be interposed between the shoulder and the upper surfaces of the jaws 4.

The plate-like element 2 may be stamped out of sheet metal with radially extending arms which are respectively slotted. The arms may then be overbent to form the jaws 3 and 4 and the substantially cylindrical openings 5 with the slots occupying positions corresponding to the positions of slots 6, as shown in the drawing. In this case, the arms are overbent substantially to form the cylindrical openings 5 and then reversely bent so that the inner and outer ends of the arms extend in substantially parallel and slightly spaced relation like jaws 3 and 4. Hence, the finished tripod head will closely approximate and will operate substantially in the same manner as the construction shown in the drawing. In some cases, the shoulder surrounding the spindle 11 may be deeper than the shoulder illustrated so that it may engage the upper surface of jaw 4 to effect compression between the jaws and to provide clearance between the operating handle or hand wheel associated with the spindle and the outer portions of the jaws lying about the cylindrical openings in which the tripod legs are journaled.

The spindle 11 is provided with an axially extending passage 18 in which a shaft 19 is rotatably supported by means of a set screw 20 which is designed to enter and engage the circumferential groove 21 of shaft 19. The set screw serves to permit rotation of shaft 19 within the passage or bore of spindle 11 while preventing relative axial movement therebetween. Of course, various means may be resorted to in rotatably mounting the shaft 19 within the bore of the spindle. The shaft 19 has a threaded upper end 22 which is designed to engage and secure a camera to the tripod head and the lower end of said shaft may be provided with a knurled knob 23 as illustrated.

Figure 2:
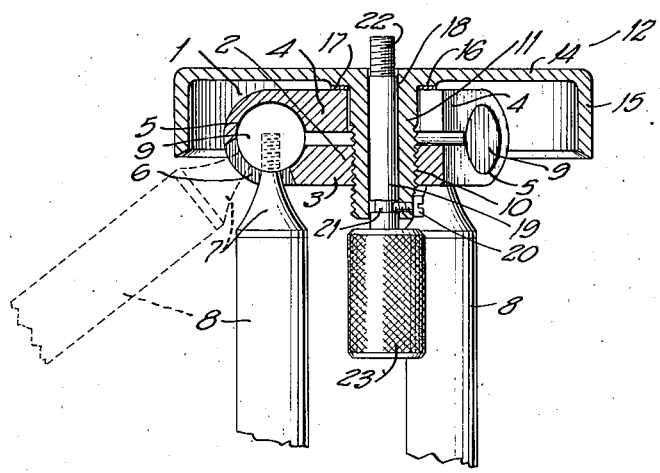
Fig. 2 is a sectional elevation view of the tripod taken in about the plane 2—2 of Fig. 1.
Figure 3:
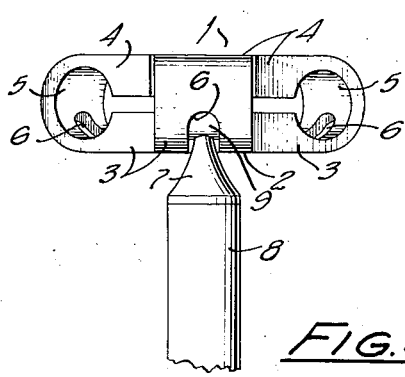
Fig. 3 is an elevation view of the tripod head with parts omitted for clearness.

When the jaws of the tripod head are substantially under no compression, the legs may be freely moved in a direction radially of the head such, for example, to the position shown in dotted lines in Fig. 2. However, when the legs have been properly positioned and it is desired to lock them in such position whereby to prevent further movement between the legs and head, the operating handle or hand wheel, comprising the disc 14 and its depending flange 15, may be turned in a direction to produce compression between the jaws 3 and 4 until the pressure exerted by the bearing surfaces of the jaws upon the respective trunnions is sufficient to prevent relative movement between the tripod head and legs. By reversing the above operation of the hand wheel, of course, the legs may be released.

It is to be noted that not only is the arrangement of my tripod head extremely compact but the jaws thereof will exert an extremely high pressure on the trunnions of the tripod legs when only a relatively small force is applied to the hand wheel. This is due to the fact that a very great leverage is obtained through the association of the elements of my tripod in the manner described. For example, the jaws 3 and 4 are connected together at their outer ends thereby providing a fulcrum while the compressive force is exerted centrally of the tripod head and at the relatively movable ends of the jaws. Hence, the pressure exerted by the jaws 3 and 4 in gripping the trunnions therebetween will be appreciably greater than the compressive force exerted at the ends of said jaws or centrally of the tripod head. Furthermore, the torque established at the spindle is dependent upon the radius of the disc 14 or hand wheel and, therefore, multiplication of the force, initially applied in turning the hand wheel, through the medium of the leverages employed provides compression of the jaws and a gripping of the trunnions of the tripod legs under a pressure far exceeding the force actually applied to the wheel.

The arrangement illustrated not only provides a tripod which may be easily operated and in which the legs may be firmly and positively locked in desired positions but it also affords a very compact assembly. It will be observed, too, that all of the legs are simultaneously released or gripped by the jaws when the spindle or hand wheel is operated.

While I have described my invention in its preferred embodiment, it is to be understood that the words which I have used are words of description and not of limitation. Hence, changes within the purview of the appended claims may be made without departing from the true scope and spirit of my invention in its broader aspects.

What I claim is:

1. In a camera tripod, a tripod head comprising a plurality of relatively radially arranged, pairs of jaws connected together at their outer ends but relatively movable at their inner ends, a plurality of tripod legs having their ends pivotally disposed respectively between said jaws, and a common means disposed centrally of said head and including an operating handle therefor extending outwardly above the jaws of said head for compressing said jaws into leg-locking position, said common means being arranged to engage said jaws in zones adjacent the movable ends thereof and the ends of said legs being disposed between the connected ends of said jaws and the zones thereof engaged by said common means whereby the gripping force exerted by said jaws, when urged toward each other, on the ends of said legs will greatly exceed the compressive force imparted to said jaws by said jaw-compressing means.

2. In a camera tripod, a tripod head comprising a plurality of relatively radially arranged, pairs of jaws connected together at their outer ends but relatively movable at their inner ends, a plurality of tripod legs having their ends pivotally disposed respectively between said jaws, and screw-threaded means disposed centrally of said head and engageable with said jaws for simultaneously urging said jaws together, said ends of said legs being disposed between the connected outer ends of said jaws and the zones thereof engaged by said threaded means, and said means including an operating handle therefor extending beyond and about said head, whereby a comparatively small force applied to said handle may cause said jaws to grip and hold said legs against pivotal movement under a pressure of comparatively high order.

3. In a camera tripod, a tripod head comprising a plate-like element having relatively radially arranged jaws extending thereabove and integral therewith at their outer ends but free at their inner ends, said element and jaws being provided with depressions adapted cooperatively to form bearings, a plurality of tripod legs journaled at one end in said bearings and a common, screw-threaded means arranged centrally of said plate-like element and adapted to engage said element and said jaws adjacent the inner, free ends thereof for compressing said element and jaws into leg-locking position, said means being provided with an operating handle extending about said plate-like element, and the bearing portions of said element and jaws being disposed between the integral, outer ends thereof and the zones of the inner, free ends of said jaws engaged by said screw-threaded means.

4. In a camera tripod, a tripod head comprising a plurality of pairs of jaws, the jaws of each pair being connected together at one end thereof but relatively movable at the other end, a plurality of tripod legs having their ends pivotally disposed respectively between said jaws, and a common, jaw-compressing means engageable with said jaws in zones adjacent the movable ends thereof for urging said jaws toward each other, the ends of said legs being disposed between the connected ends of said jaws and the zones thereof engaged by said jaw-compressing means whereby the gripping force exerted by said jaws on said legs will greatly exceed the compressive force imparted to said jaws by said jaw-compressing means.

5. In a camera tripod, a tripod head comprising a plurality of pairs of jaws, the jaws of each pair being connected together at one end thereof but relatively movable at the other end, a plurality of tripod legs, and means engageable with said jaws and including screw-threaded means for simultaneously urging said jaws toward each other, the ends of said legs being disposed between the connected ends of said jaws and the zones thereof engaged by said means whereby the gripping force exerted by said jaws on said legs will greatly exceed the compressive force imparted to said jaws by said means.

HENRY F. DUBAS.